(12) United States Patent
Bargury et al.

(10) Patent No.: US 11,429,724 B2
(45) Date of Patent: Aug. 30, 2022

(54) MACHINE LEARNING DETECTION OF UNUSED OPEN PORTS

(71) Applicant: MICROSOFT TECHNOLOGY LICENSING, LLC., Redmond, WA (US)

(72) Inventors: Michael Zeev Bargury, Ramat Gan (IL); Moshe Israel, Ramat Gan (IL); Ben Kliger, Ramat Gan (IL); Yotam Livny, Gadera (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 347 days.

(21) Appl. No.: 15/924,733

(22) Filed: Mar. 19, 2018

(65) Prior Publication Data
US 2019/0286826 A1    Sep. 19, 2019

(51) Int. Cl.
| G06F 21/57 | (2013.01) |
| G06N 5/02 | (2006.01) |
| H04L 9/40 | (2022.01) |
| G06N 20/10 | (2019.01) |
| G06N 20/20 | (2019.01) |
| G06F 21/55 | (2013.01) |
| G06N 5/00 | (2006.01) |
| G06N 3/02 | (2006.01) |

(52) U.S. Cl.
CPC .......... *G06F 21/577* (2013.01); *G06F 21/554* (2013.01); *G06N 5/02* (2013.01); *G06N 20/20* (2019.01); *H04L 63/0227* (2013.01); *H04L 63/1408* (2013.01); *G06F 2221/034* (2013.01); *G06N 3/02* (2013.01); *G06N 5/003* (2013.01); *G06N 20/10* (2019.01)

(58) Field of Classification Search
CPC .................. G06F 21/577; G06F 2221/034
See application file for complete search history.

(56) References Cited

U.S. PATENT DOCUMENTS

| 9,275,345 | B1 * | 3/2016 | Song ...................... G06N 20/00 |
| 9,544,798 | B1 * | 1/2017 | Ahmadzadeh ........ H04W 24/08 |
| 9,571,517 | B2 * | 2/2017 | Vallone ............... H04L 41/0886 |
| 9,654,485 | B1 * | 5/2017 | Neumann ........... H04L 63/1441 |
| 9,716,727 | B1 * | 7/2017 | Seger .................. H04L 63/1491 |
| 10,068,095 | B1 * | 9/2018 | Segal .................... G06F 21/577 |
| 10,148,752 | B2 * | 12/2018 | DiGiambattista ......... G06F 8/61 |

(Continued)

OTHER PUBLICATIONS

Gordon, Lyon Fyodor., "NMAP Reference Guide", Retrieved From: http://bandwidthco.com/whitepapers/netforensics/recon/nmap/NMAP-Reference-Guide.pdf. Jan. 2005, 37 Pages.

(Continued)

*Primary Examiner* — Viral S Lakhia

(57) ABSTRACT

A security service utilizes a machine learning model to detect unused open ports. A security agent on client machines tracks the operating executables and the open ports on a machine. A machine learning model is trained for a specific port number using the more commonly-used executables that run on machines having the port opened from a large and diverse population of machines. The model is then used to determine the ports that an executable is likely to be associated with which is then used to determine if a particular machine has an unused open port.

17 Claims, 7 Drawing Sheets

(56) References Cited

U.S. PATENT DOCUMENTS

| | | | |
|---|---|---|---|
| 10,185,832 B2 * | 1/2019 | Cam | G06F 21/577 |
| 10,277,622 B2 * | 4/2019 | DiGiambattista | H04L 63/1433 |
| 10,810,106 B1 * | 10/2020 | Amit | G06F 11/3604 |
| 2014/0380485 A1 * | 12/2014 | Ayyagari | H04L 63/1433 |
| | | | 726/25 |
| 2016/0088006 A1 * | 3/2016 | Gupta | H04L 43/08 |
| | | | 726/23 |
| 2016/0344770 A1 | 11/2016 | Verma et al. | |
| 2016/0359872 A1 * | 12/2016 | Yadav | H04L 63/1408 |
| 2017/0171221 A1 * | 6/2017 | Ho | G06F 21/552 |
| 2017/0237778 A1 * | 8/2017 | DiGiambattista | G06N 20/00 |
| | | | 726/1 |
| 2017/0364576 A1 | 12/2017 | Chesla et al. | |
| 2018/0048534 A1 * | 2/2018 | Banga | G06N 20/00 |
| 2018/0129961 A1 * | 5/2018 | Kailas | G06N 7/005 |
| 2018/0159887 A1 * | 6/2018 | DiGiambattista | G06F 21/577 |
| 2018/0196942 A1 * | 7/2018 | Kashyap | G06F 21/56 |
| 2018/0270229 A1 * | 9/2018 | Zhang | H04L 69/22 |
| 2019/0014141 A1 * | 1/2019 | Segal | G06F 21/554 |
| 2019/0250898 A1 * | 8/2019 | Yang | H04L 63/1408 |
| 2019/0278928 A1 * | 9/2019 | Rungta | G06F 9/44505 |

OTHER PUBLICATIONS

"International Search Report and Written Opinion issued in PCT Application No. PCT/US2019/021522", dated Apr. 29, 2019, 12 Pages.

\* cited by examiner

MACHINE LEARNING DETECTION OF UNUSED OPEN PORTS

BACKGROUND

A computer network connects a large number of computing devices (e.g., computers, servers, routers, switches, etc.) in order to facilitate the exchange of data and sharing of resources. These computing devices have a port or endpoint that is the point of interconnection between the computing device and a computer network. A computing device may support a large number of endpoints or ports that receive incoming traffic. The port is defined by a network address, a protocol and data format specification. Some ports, such as port 80, commonly used for the Hypertext Transfer Protocol (HTTP) support, may be assigned or opened to allow traffic to pass through to a corresponding service.

Endpoints or ports are often the target of cyber criminals. Cyber criminals seek open ports in order to get access to the applications and services behind them. Network attacks are not always immediately identifiable due to the complexity of the network and the number of open ports. The simplest approach would be to close those ports that are not being used.

However, it is not always possible to keep track of which ports are open at a given time. The maintenance of security configurations, at times, can become a burdensome administrative overhead. Servers may be configured with one set of open ports and later be reconfigured to operate with another set of open ports. The unused open ports of the previous configuration may not have been closed. Other applications and services may configure a firewall with exceptions automatically that are not recognized resulting in ports being left opened unintentionally. Administrators may open ports without closing them when not needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A security service utilizes a machine learning model to detect unused open ports on machines connected to a cloud-based service. A security agent on the machines (i.e., virtual machines and/or computing devices) tracks the operating executables and open ports on the machines in a sampled population. Data mining techniques are used to analyze this sampled data to determine the most commonly-used executables and the port numbers that are opened on the machines while running the commonly-used executables.

A machine learning model is generated for a specific port number. The model is trained using features that identify the executables executing on a machine with the port open and the executables executing on a machine that do not have the port open. The model is tested until it achieves a target level of accuracy. The model classifies those executables likely to be associated with a specific open port. The model is then used to determine if a machine has an unused open port by its use of one or more executables that the model indicates is not associated with a port that the machine has open. Notification is provided to the machine of the unused open port.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a mechanism for detecting whether a machine (e.g., virtual machine, computing device, server etc.) has an unused open port. The mechanism involves a technique that mines data from various types of computing devices in various computing environments (enterprise, cloud services, web services, client machines, user devices, etc.) to find the more commonly-used executable codes over a sampled population. Execution logs are collected from various machines which identify the executable code or executables running in a particular machine and the open ports on these machines.

The execution logs from the machines are analyzed to select the most commonly-used executable code and to obtain the open ports used in the machines that run the most commonly-used executable code. A classifier model is trained using this data to learn which executables are related to a specific port number. The model is then used to identify a machine having an unused open port by predicting the likelihood that the machine is running executables that do not need a port that is currently open on the machine. In this case, the machine is considered to have an unused open port that is not needed and which should be closed. Notification is then provided to the operators of the machine.

Attention now turns for a more detailed description of a system that detects the likelihood of an unused open port.

System Utilizing Machine Learning to Detect Unused Open Ports

Figure 1:
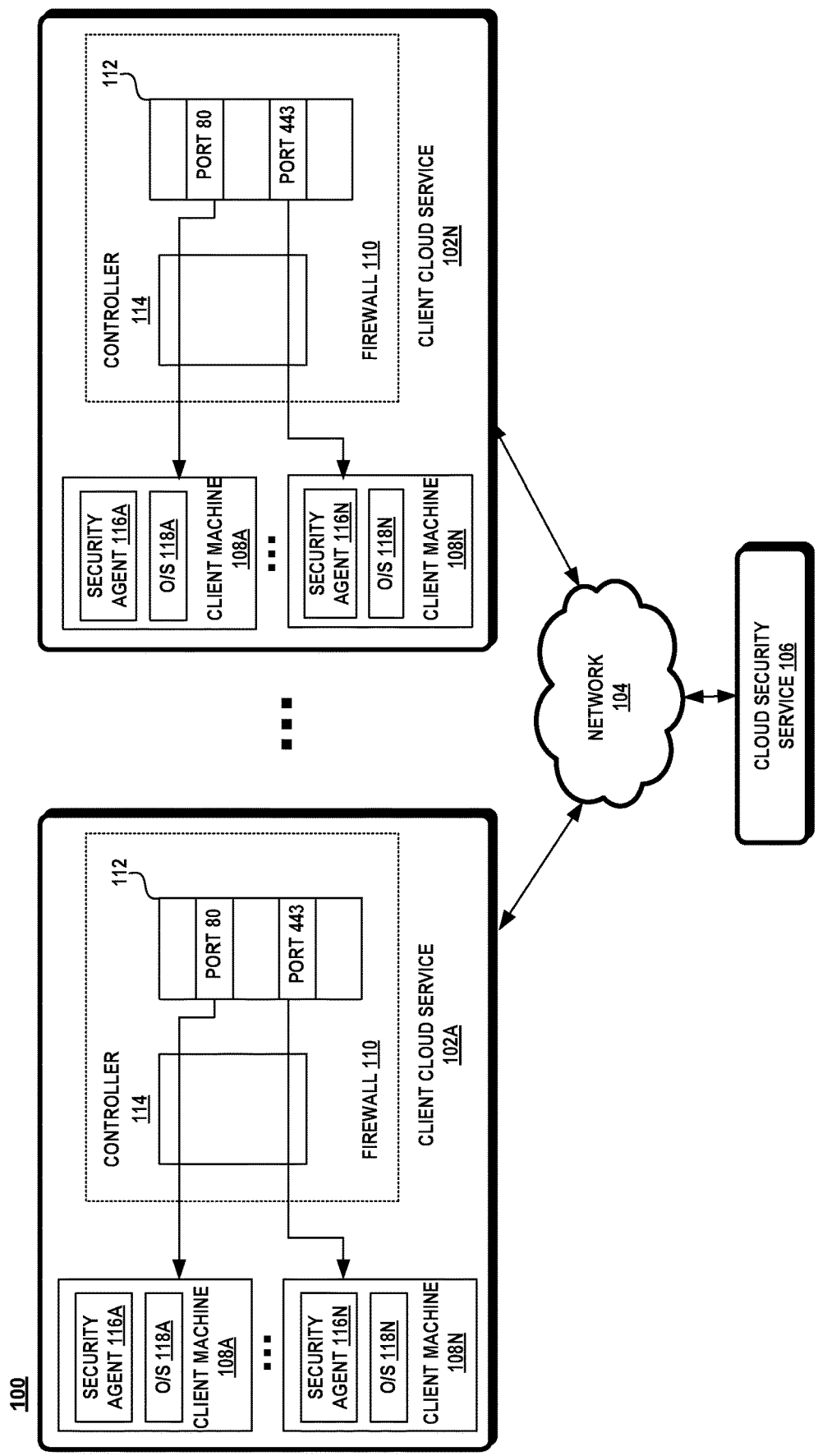
FIG. 1 illustrates an exemplary system for machine learning detection of an unused open port.

FIG. 1 illustrates an exemplary system 100 configured to facilitate the detection of an unused open port. In one aspect, the system 100 includes one or more client cloud services 102A-102N (collectively "102") connected through a network 104 to a cloud security service 106. A client cloud service 102 is any web service made available to users on demand through the Internet. The network 104 can be any type of network that connects the client cloud services 102 with the cloud security service 106. In one aspect, the network utilizes the Internet Protocol (IP) protocol. The cloud security service 106 is a web service that offers cloud-hosted security services, such as without limitation, endpoint protection, malware protection, firewall and integrity monitoring, security risk and compliance monitoring, and the like.

A client cloud service 102 may include one or more client machines 108A-108Z (collectively "108") and a firewall 110. A client machine 108 may be a physical computing device such as a server, a virtual machine, or any combination thereof. The firewall 110 may include one or more ports 112 and a controller 114. The controller 114 controls which ports 112 are open or closed. A port 112 allows a computer to support multiple communication sessions through a specific protocol with other computers and resources on the network. A port 112 is associated with the IP address of a host. A port 112 has a port number that identifies its associated protocol.

In the Transmission Control Protocol (TCP) and the User Datagram Protocol (UDP), the port numbers range from 1-65,535. There are three categories of port numbers: (1) port numbers 1-1023 are well known ports which are associated with system processes of widely used network services; (2) port numbers 1024-49151 are registered ports which are assigned by the Internet Assigned Numbers Authority (IANA) and used with a certain protocol or application; and (3) port numbers 49152-65535 are private or dynamic ports that are active for a particular session.

Common port numbers include the following:
21: File Transfer Protocol (FTP)
22: Secure Shell (SSH)
23: Telnet remote login service
25: Simple Mail Transfer Protocol (SMTP)
53: Domain Name System (DNS) service
80: Hypertext Transfer Protocol (HTTP)
110: Post Office Protocol (POP3)
119: Network News Transfer Protocol (NNTP)
123: Network Time Protocol (NTP)
143: Internet Message Access Protocol (IMAP)
161: Simple Network Management Protocol (SNMP)
194: Internet Relay Chat (IRC)
443: HTTP Secure (HTTPS)

A client machine 108 may include a security agent 116A-116N (collectively, "116") and an operating system 118A-118N (collectively, "118"). The operating system 118 manages the hardware devices and software applications executing on a client machine 108. The security agent 116 obtains data on the executable codes that run on the client machine 108. The security agent 116 may obtain this data from the operating system 118 which manages the running processes on a client machine 108. In addition, the security agent 116 tracks the open ports on a client machine 108. The security agent 116 may obtain from the controller 114 the identity of the open ports in a client machine 108. The security agent 116 collects data on the running processes and the open ports for one or more of the client machines 108 which is then transmitted to the cloud security service 106 for further analysis.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. Although FIG. 1 illustrates a system having client cloud services and a client security service, the techniques described herein can be applied to any type of computing devices and configuration thereof that interface with a network through ports or endpoints.

Figure 2:
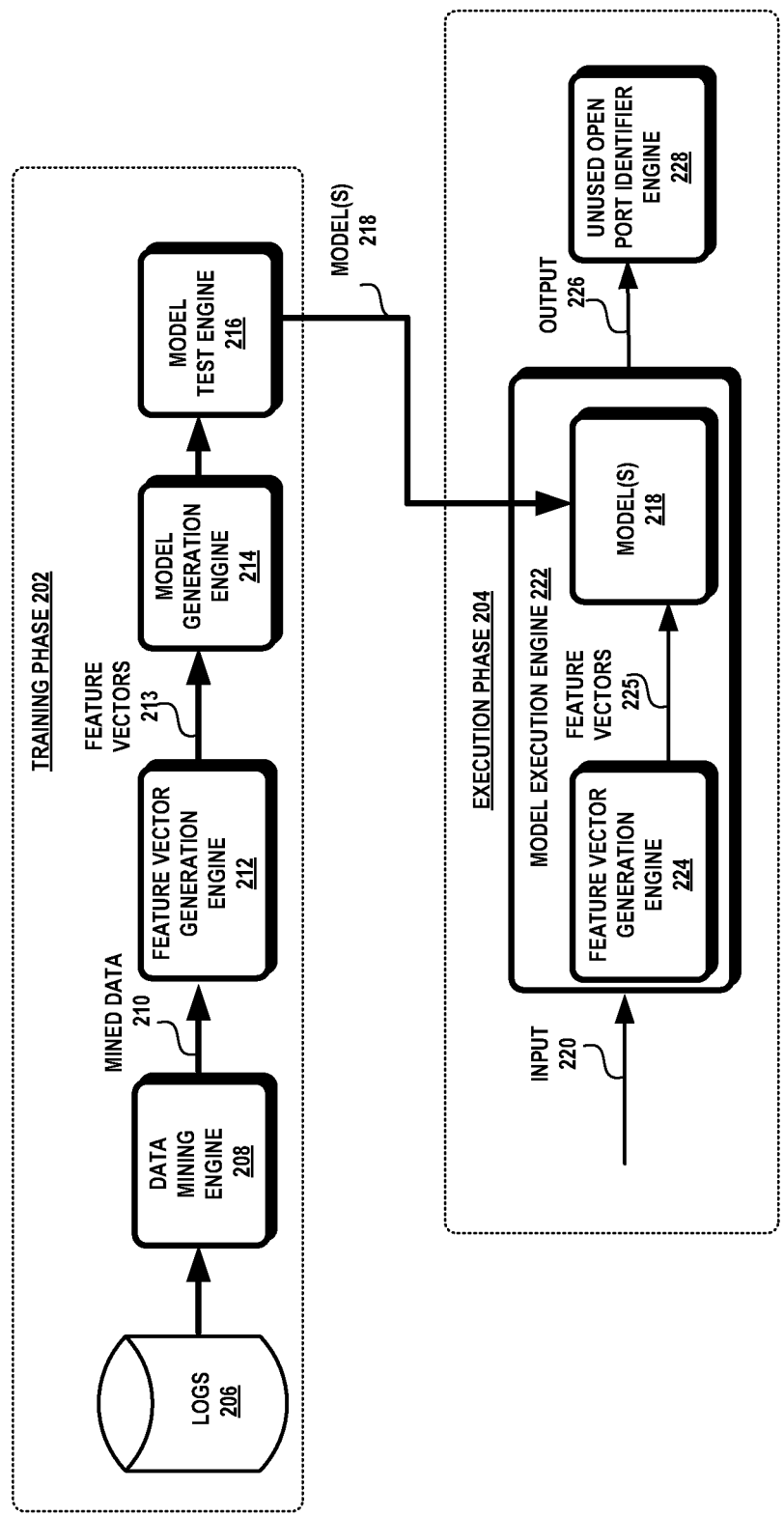
FIG. 2 is an exemplary system of a cloud security service.

Referring to FIGS. 1 and 2, there is shown a cloud security service 106 that includes logs 206 received from one or more of the client machines 108, a data mining engine 208, a feature vector generation engine 210, a model generation engine 212, and a model test engine 214, all of which are used in a training phase 202 to generate one or more models 218.

The security agent 116 on each client machine 108 generates a log 206 that identifies the executable code that runs on a particular client machine and the open ports on each client machine. Executable code or an executable is a file or program having programmable instructions that when executed on at least one processor perform tasks according to the programmable instructions. An executable may be embodied in a file or program in any form, such as without limitation, source code, binary code, byte code, machine code, native code, interpreted code, script code, etc. A commonly-used executable is an executable that frequently runs on multiple machines. A set of rules is used to determine which executables from the minded data are frequently executed the most and as such are included in the set of commonly-used executables.

The data mining engine 208 reads the logs 206 to determine the more commonly-used executables from the sampled population and the open ports on the machines running a commonly-used executable. The data mining engine 208 extracts the data from the logs of these machines which is sent to the feature vector generation engine 212 as mined data 210. The feature vector generation engine 214 generates feature vectors 213 from the mined data 210 which is then used by a model generation engine 214 to generate a model which is tested by a model test engine 216. The output of the training phase 202 is a set of models 218 which include a model for a select number of port numbers in the mined data 210.

The cloud security service 106 also includes a model execution engine 222 that is used in an execution phase 204 to predict the likelihood that the executables running on a machine are associated with one or more open ports. In the execution phase 204, the cloud security service 106 receives input from a client machine 108 indicating the executables running on the client machine 108 and its open ports. A feature vector generation engine 224 generates one or more feature vectors 225 from this input which is then input to one or more models 218 which is used to generate an output 226 that indicates whether the executables are associated with an open port. The model execution engine 222 may use models that are associated with different ports number since the machine may have multiple open ports.

The unused open port identifier engine 228 determines that there is an unused open port by using the output of the models 226 which found no association between the executables running on a machine and a port that is currently open on a machine. The unused open port identifier engine 228 infers an unused open port by using the model to indicate which executables running on the machine are likely to be associated with a specific open port. The unused open port identifier engine 228 deduces that the machine has an unused open port if the models indicate that the executables running on the machine are not likely associated with its open ports.

Attention now turns to descriptions of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
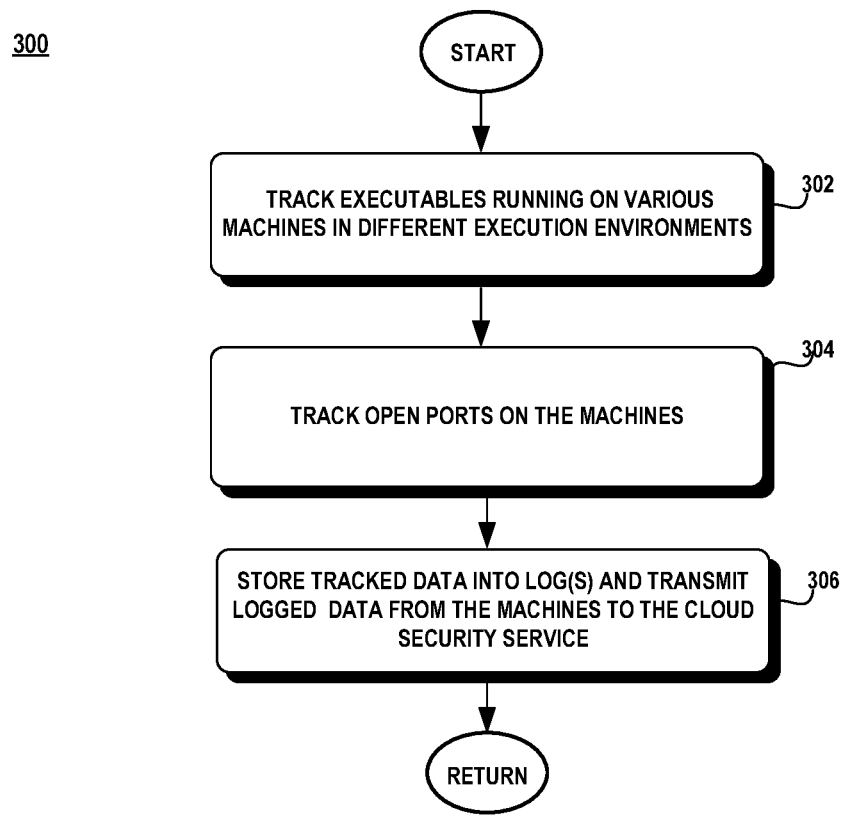
FIG. 3 is a block diagram illustrating an exemplary method of tracking processes running executables and open ports on a client machine.

Turning to FIGS. 1 and 3, there is shown an exemplary method 300 for obtaining training data from various machines in different execution environments. Initially, a security agent 116 is installed on one or more client machines 108 in a client cloud service 102 (block 302). The security agent 116 interacts with the operating system 118 to obtain the identity of the executables running on the client machine 108 (block 302). In addition, the security agent 116 interacts with the controller 114 of the firewall 110 to track the identity of the open ports (block 304). The security agent 116 obtains this information for a predetermined period of time which is stored into one or more logs (block 306). The logged data is then transmitted to the cloud security service 106 (block 306).

Figure 4:
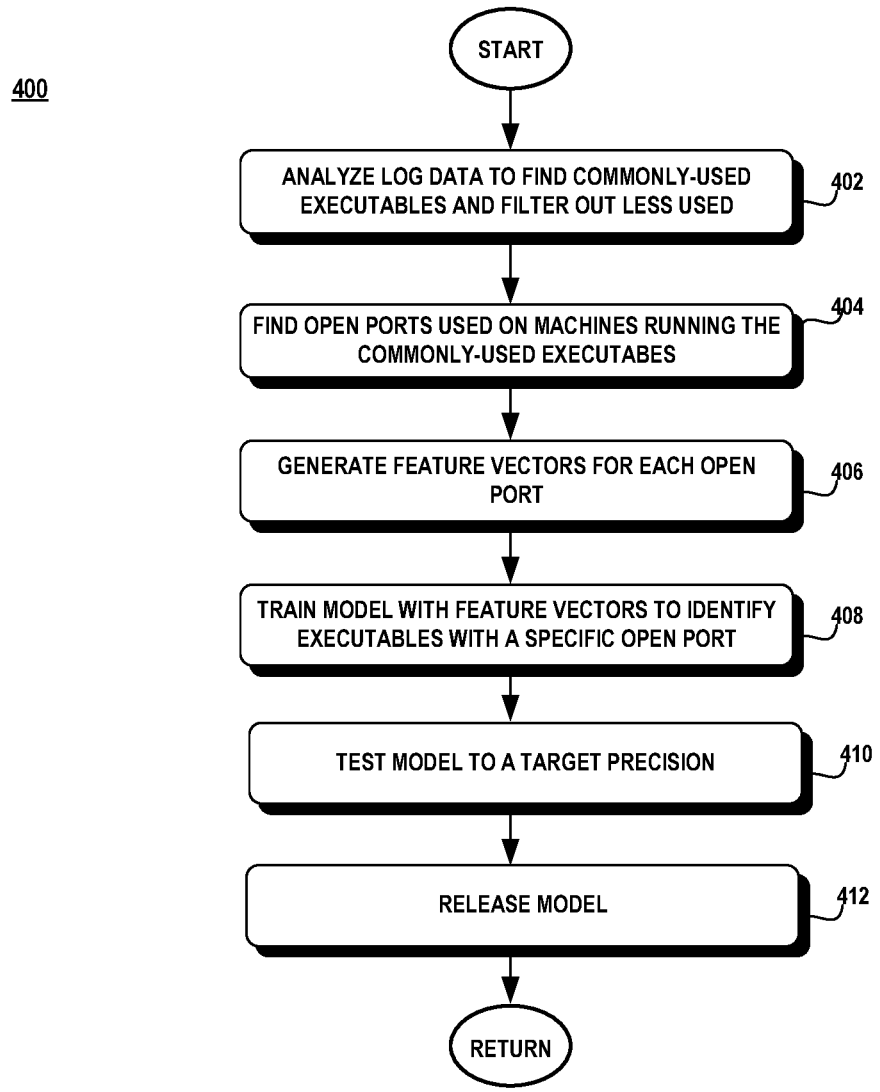
FIG. 4 is a block diagram illustrating exemplary operations to generate and test a machine model to predict unused open ports.

Turning to FIG. 4, there is shown an exemplary method 400 for analyzing the logs to generate feature vectors to train and test a model. The log data is analyzed to determine which are the more commonly-used executables (block 402). Heuristic rules may be utilized to filter out the outliers in the mined data in order to produce the set of commonly-used executables (block 402). The log data is also analyzed to find the open ports on each machine running the commonly-used executables (block 404).

One or more feature vectors are generated for each machine having at least one open port. A feature vector represents which of the commonly-used executables a machine has executed with a specific open port. There may be multiple feature vectors for a machine if the machine has multiple open ports. (block 406). A machine learning model for a particular port is trained with the feature vectors (block 408). The machine learning model is then tested to ensure that its performance is within certain precision (block 410). When the machine learning model reaches the target precision, the model is released (block 412). Otherwise, the model is retrained until it reaches the target precision.

The target precision, level of accuracy, or error rate can be used to determine whether the model is ready. A level of accuracy can be defined as $$Accuracy = \frac{Number\ of\ correct\ predictions}{Total\ number\ of\ predictions}$$

and the error rate can be defined as $$Error\ Rate = \frac{Number\ of\ wrong\ predictions}{Total\ number\ of\ predictions}.$$

In one aspect, a 99% accuracy rate is targeted.

Figure 5:
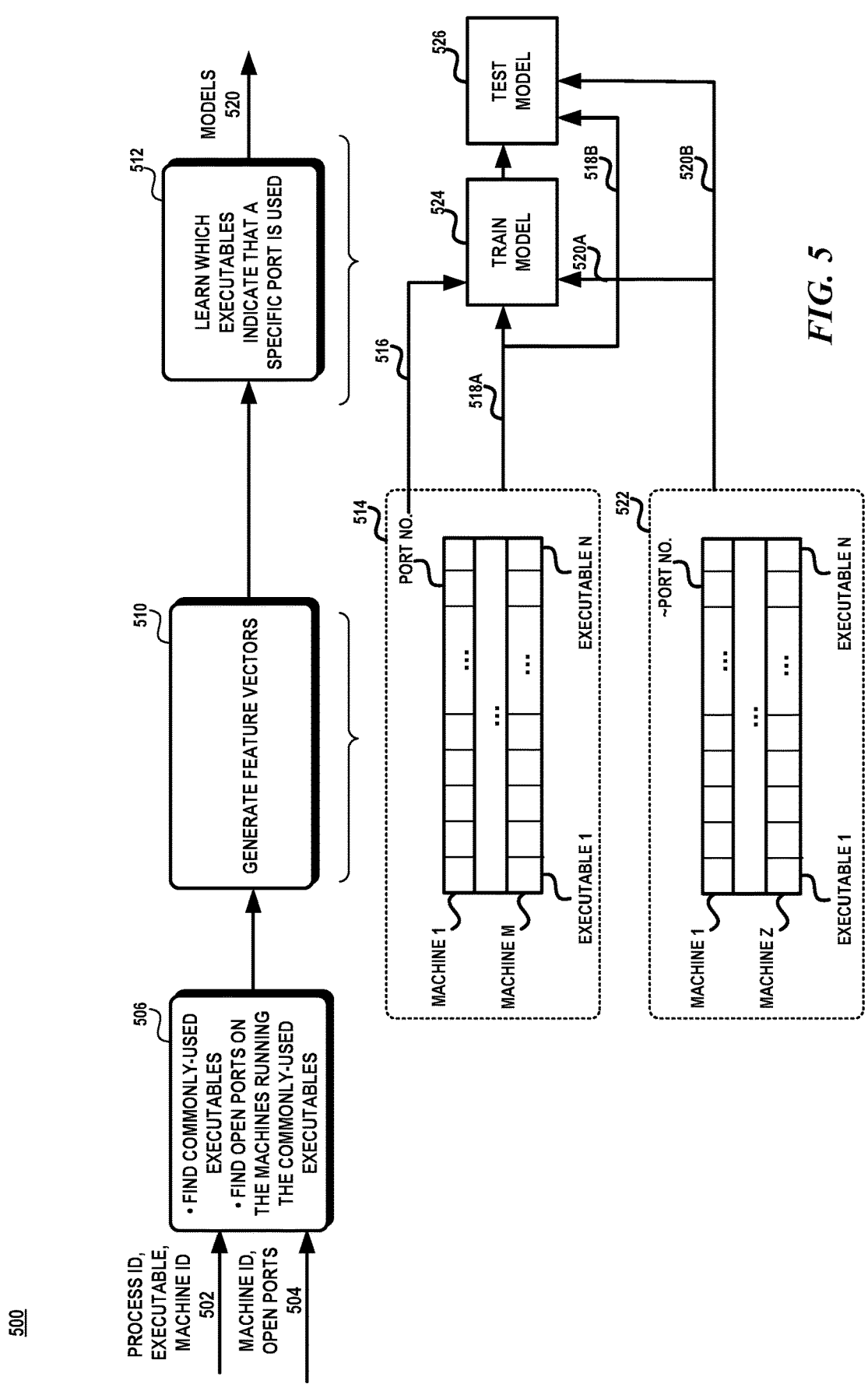
FIG. 5 is a schematic diagram illustrating the generation of the machine learning models from training data collected from client machines.

This method is more particularly described with respect to the operations shown in FIG. 5. Turning to FIGS. 2 and 5, in one aspect 500, the cloud security service 106 may receive one or more log files 502 that include a process identifier, an identifier of an executable, and a machine identifier from each client machine 108. In addition, the cloud security service 106 may receive one or more additional log files 504 that include a machine identifier and a list of the port numbers of the open ports. The data mining engine 208 may aggregate the data so that each executable and open port number is grouped with its respective machine identifier (block 506). The data mining engine 208 analyzes this data in order to determine which are the most commonly-used executables and which port numbers are open on machines that run the most commonly-used executables (block 506). In one aspect, only the most commonly-used executables are selected.

The feature vector generation engine 212 generates a feature vector for each machine having a known open port (block 510). A feature vector contains a field for each executable in the set of commonly-used executables. The field is a binary value that indicates whether an executable is used in the machine. The feature vectors are grouped together by open port number. As shown in FIG. 5, table 514 is associated with a specific port number 516 and table 522 is associated with another port number that differs from the specific port number. Table 514 includes a feature vector for a machine, machine 1 . . . machine M, that has the specific port number open. Each feature vector has a field that represents an executable from the set of commonly-used executables, executable 1 . . . executable N. Each field has a bit value representing whether the corresponding executable is used by the machine (bit="1") or not (bit="0").

Likewise, table 522 includes feature vectors associated with machines having an open port whose port number differs from the specific port number 516. The feature vectors in this table 522 are for a number of machines, machine 1 . . . machine Z, and each field in the feature vector represents an executable in the set of commonly-used executables, executable 1 . . . executable N. Each field has a bit value representing whether the corresponding executable is used by the machine (bit="1") or not (bit="0").

A model is trained for a set of port numbers (block 524). In one aspect, the set of port numbers may include all the known port numbers. In other aspects, the set of port numbers may include a subset of the known port numbers specific for an intended target. The model is trained on both feature vectors known to be associated with the specific port number 518A and feature vectors that are not associated with the specific port number 520A. The model is then tested (block 526). The model can be tested on both feature vectors known to be associated with the specific port number 518B and feature vectors that are not associated with the specific port number 520B. The entire set of feature vector training data can be split so that one set of feature vectors is used to train the model and another set of feature vectors is used to test the model. Upon an intended accuracy or error rate being achieved during the model test phase, the models 520 are released.

In one aspect, a classification model is used as the machine learning model. A classification model assigns features to one of several predefined categories or labels. Classification learns a target function ƒ that maps each feature in a feature vector to one or the predefined labels or open ports. A classification model can be used to predict whether a set of features is associated with a predefined label or in this case, an open port. Classification techniques are most apt for predicting data with binary or nominal categories. There are various types of classification models such as decision tree classifiers, rule-based classifiers, neural networks, support vector machines, and naïve Bayes classifiers and any of these other types of classification models may be used.

In one aspect, a random forest is used as the classification model. A random forest is a decision tree classifier where multiple random trees are constructed and used to generate a probability or classification (i.e., label). A set of features to consider is selected by each tree in the random forest, and the application of the tree model to input data yields a probability of classification. The forest votes for the classification having the most votes or highest probability. Hence, the random forest is a classifier consisting of a collection of tree-structured classifiers $\{h(x, \theta_k), k=1, \ldots\}$ where $\{\theta_k\}$ are independent identically distributed random vectors and each tree casts a unit vote for the most popular class at input x.

Figure 6:
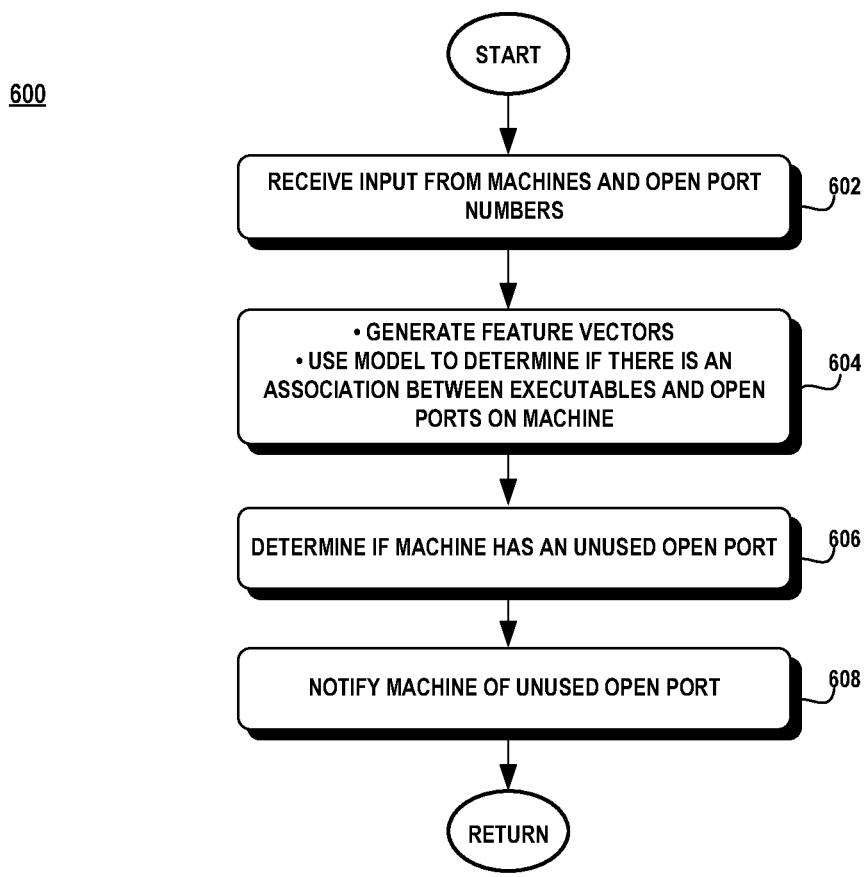
FIG. 6 is a block diagram illustrating an exemplary method of utilizing a machine learning model to detect an unused open port.
Figure 7:
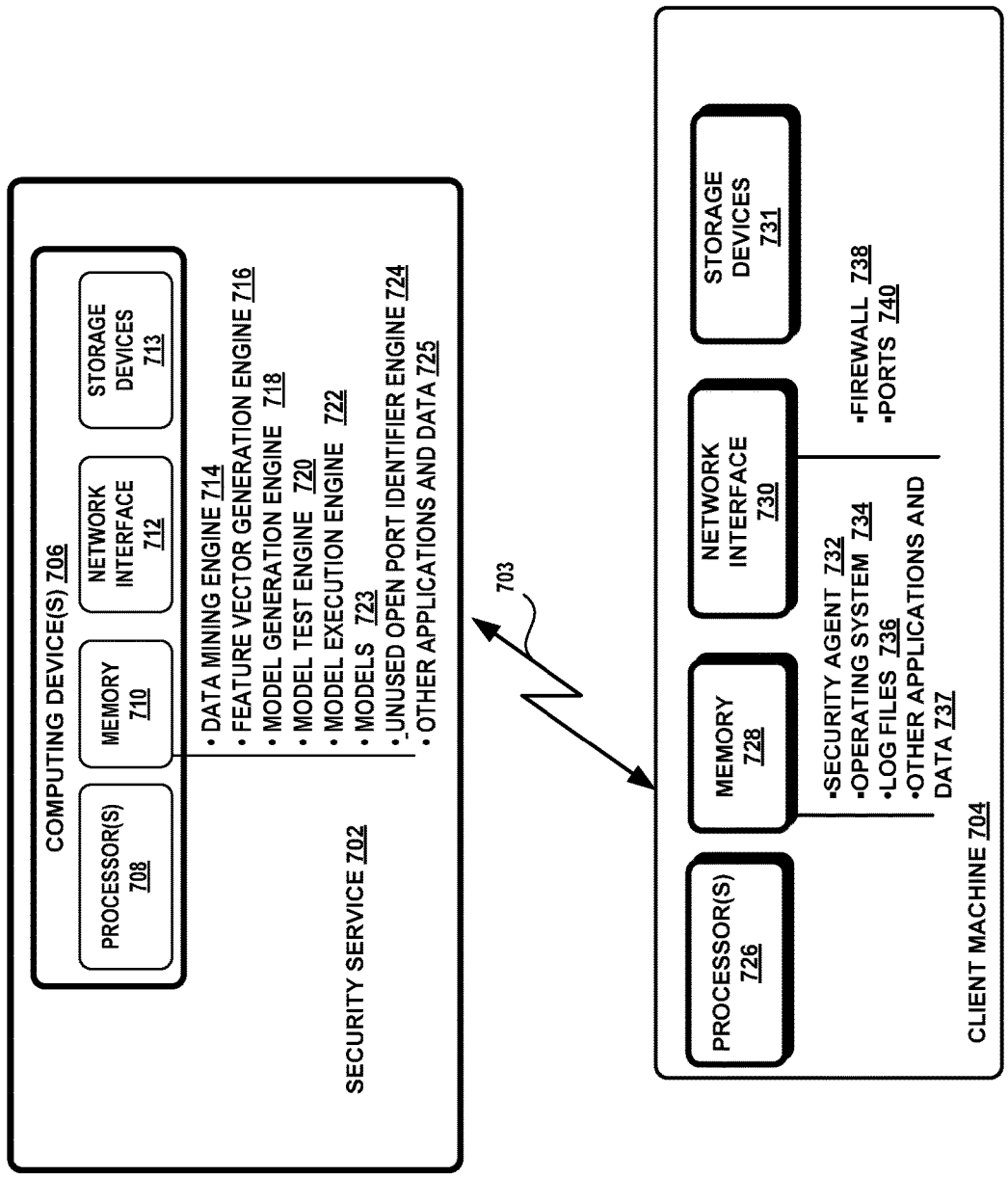
FIG. 7 is a block diagram illustrating an exemplary computing or operating environment.

FIG. 6 illustrates an exemplary method for utilizing the model to detect an unused open port. The security agent on a client machine may track the executables that are running on a particular machine and the open ports. The list of the executables and the port numbers of the open ports may be transmitted to the cloud security service (block 602). The cloud security service utilizes the feature vector generation engine of the model execution engine to generate feature vectors for this input (block 602). The feature vectors contain a field for each executable in the set of commonly-used executables with a bit value indicating whether the executable is used or not by the machine (block 602).

The feature vectors are then input into one or more models corresponding to the port numbers used in the machine (block 604). The model will determine whether the executables have an association with the particular port number which indicates that the open port is used (block 604). The unused open port identifier engine determines that there is an unused open port when the model finds no association between the executables and an open port on the machine (block 606). The cloud security service may then take appropriate action to notify the administrator or user of the client machine to recommend closing the identified unused open port (block 608).

Operating Environment

Attention now turns to a discussion of an exemplary operating environment. It should be noted that the operating environment 700 is exemplary and is not intended to suggest any limitation as to the functionality of the embodiments. The embodiments may be applied to an operating environment 700 utilizing a security service 702 coupled to at least one client machine 704 through a network 703.

The security service 702 includes one or more computing devices 706. A computing device 706 maybe any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

The computing devices 706 may include one or more processors 708, a memory 710, a network interface 712, and storage devices 713. A processor 708 may be any commercially available processor and may include dual microprocessors and multi-processor architectures. The network interface 712 facilitates wired or wireless communications between the computing device 706 and other devices. The storage devices 713 may be computer-readable medium that does not contain propagating signals, such as modulated data signals transmitted through a carrier wave. Examples of the storage devices 713 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave.

The memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 710 may also include one or more external storage devices or remotely located storage devices that do not pertain to propagated signals, such as modulated data signals transmitted through a carrier wave. The memory 710 may contain instructions, components, and data, such as a data mining engine 714, a feature vector generation engine 716, a model generation engine 718, a model test engine 720, a model execution engine 722, one or more models 723, an unused open port identifier engine, and other applications and data 725.

The network 703 facilitates communications between the security service 702 and the client machines 704. The network 703 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

A client machine 704 and the security service 702 may include various types of standard communication elements designed to be interoperable with the network 703, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

The client machine 704 maybe embodied as any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The client machine 704 may include one or more processors 726, a memory 728, a network interface 730, and storage devices 731. A processor 726 may be any commercially available processor and may include dual microprocessors and multi-processor architectures. The network interface 730 facilitates wired or wireless communications between the client machine 704 and other devices on the network 703 via a firewall 738 and one or more ports 740. The storage devices 731 may be computer-readable medium that does not contain propagating signals, such as modulated data signals transmitted through a carrier wave. Examples of the storage devices 731 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave.

The memory 728 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 728 may also include one or more external storage devices or remotely located storage devices that do not pertain to propagated signals, such as modulated data signals transmitted through a carrier wave. The memory 728 may contain instructions, components, and data, such as a security agent 732, an operating system 734, one or more log files 736 and other applications and data 737.

Technical Effect

Aspects of the subject matter disclosed herein pertain to the technical problem of determining whether a machine has an unused open port. The technical features associated with addressing this problem are machine learning models, such as a random forest classifier, that can predict the likelihood of an executable using a specific port. The machine learning model learns the executables that are more likely to be associated with a usable open port. If a machine has a port open and is not running at least one of the executables identified by the model as being associated with the open port, then the machine has an unused open port.

A security service uses the machine learning models to monitor client machines for unused open ports which if left open can subject the machine to malicious attacks. The techniques disclosed are able to perform this detection automatically and in a manner that does not negatively impact the performance of the client machine. The use of the models provides a more accurate prediction of an unused open port since the models can find hidden insights in a large volume of data which would be difficult and time consuming to perform manually.

A system is disclosed having one or more processors and a memory. The memory stores instructions which when executed by the one or more processors cause the one or more processors to perform operations to use one or more classification models to determine a likelihood that one or more executables running on a particular machine are associated with a port open on the particular machine and determine that the particular machine has an unused open port when the one or more classifications models determine that the one or more executables running on the particular machine are not likely to be associated with an open port on the particular machine.

The system also includes instructions that generate at least one feature vector for the particular machine, the at least one feature vector used as input to at least one of the one or more classification models, the at least one feature vector indicating which executables from a set of commonly-used executables the particular machine processes.

In one aspect, the one or more classifications models may be based on a random forest classifier but in other aspects, may be based on neural network, a decision tree classifier, a rule-based classifier, a support vector machine, and/or naïve Bayes classifier. A machine may comprise a virtual machine. A port may be configured with a Transmission Control Protocol (TCP) port number and/or User Datagram Protocol port number. The system may include further instructions that generate the one or more classification models from training data extracted from a plurality of machines running an executable with at least one port open. The system may be embodied as a cloud service.

A device may comprise at least one processor and a memory. The at least one processor may be configured to utilize a classification model to determine a likelihood that executable code running on a particular machine with an open port uses the open port, wherein the classification model is configured to classify one or more executable codes with a port number that is used by the one or more executable codes, determine that the particular machine has an unused open port when the classification model indicates a low probability of the executable code running on the particular machine being associated with the open port, and determine that the open port is used when the classification model indicates a high probability of the executable code running on the particular machine being associated with the open port.

In one aspect, the device may utilize the classification model as a random forest classifier and in other aspects, the device may utilize the classification model as a neural network, a rule-based classifier, a support vector machine, or naïve Bayes classifier. The classification model may be trained on a plurality of feature vectors that represent executables running on a machine with the first open port and a plurality of feature vectors that represent executables running on a machine without the first open port.

A method is disclosed that can implemented on a system or device disclosed herein that obtains input data from a machine having a first open port, the input data including one or more executables running on the machine with the first open port, uses a classification model, tailored for the first open port, to predict a likelihood that the one or more executables running on the machine are associated with the first open port, and determines that the first open port is an unused open port based on the likelihood indicating a low probability of an association of the one or more executables being associated with the first open port.

The method further comprises training the classification model with a plurality of feature vectors that represent executables running on a machine with the first open port and a plurality of feature vectors that represent executables running on a machine without the first open port. The method also obtains log data from a plurality of machines, the log data including one or more executables running on a machine concurrently with one or more ports open and aggregates the log data to determine a set of commonly-used executables, wherein a commonly-used executable is run more frequently on the plurality of machines. The method trains the classification model using the log data from the set of commonly-used executables. The classification model may be a random forest classifier, a neural network, a decision tree classifier, a rule-based classifier, a support vector machine, or naïve Bayes classifier. A port may be associated with a Transmission Control Protocol (TCP) port number or a User Datagram Protocol (UDP) port number.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
one or more processors; and
a memory having instructions stored thereon, which when executed by the one or more processors causes the one or more processors to perform acts that:
identify one or more executables running on a first machine with one or more open ports;
obtain a classifier to identify a likelihood that a machine has an unused open port, wherein the classifier is trained on training data extracted from a plurality of machines running a plurality of executables with a plurality of open ports;
use the classifier to predict whether the one or more executables running on the first machine are likely to need each of the one or more open ports; and
determine that a select one of the one or more open ports of the first machine is an unused open port when the classifier predicts that there is no association, between the one or more executables running on the first machine and the select one of the one or more open ports of the first machine, that indicates that the select one of the one or more open ports of the first machine is used by the one or more executables running on the first machine.

2. The system of claim 1, wherein the classifier is trained with training data for a set of ports.

3. The system of claim 1, wherein the memory includes further instructions that when executed by the one or more processors causes the one or more processor to perform acts that:
determine that a second one of the one or more open ports of the first machine is not an unused open port when the classifier predicts that there is an association with the second one of the one or more open ports of the first machine and the one or more executables of the first machine.

4. The system of claim 1, wherein the memory includes further instructions that when executed by the one or more processors cause the one or more processor to perform acts that:
generate a feature vector having a field for each commonly-used executable;
set a bit in each field corresponding to the one or more executables; and
input the feature vector to the classifier.

5. The system of claim 1, wherein the classifier includes a neural network, a decision tree classifier, a rule-based classifier, a support vector machine, or naïve Bayes classifier.

6. The system of claim 1, wherein the first machine comprises a virtual machine.

7. The system of claim 1, wherein the classifier is a random forest model.

8. A method executing on a computing device having at least one processor and a memory, the method comprising:
obtaining input data from a first machine including executables running on the first machine and at least one open port;
using a classification model, trained for the at least one open port, to predict a likelihood of the executables running on the first machine having an association with the at least one open port, wherein the classification model is trained on training data extracted from a plurality of machines running a plurality of executables with a plurality of open ports; and
determining that the at least one open port is an unused open port when the classification model predicts a high likelihood of no association between the executables running on the first machine and the at least one open port to indicate the executables running on the first machine use the at least one open port.

9. The method of claim 8, further comprising:
obtaining log data from the plurality of machines, the log data including one or more executables running on the plurality of machines concurrently with one or more ports open.

10. The method of claim 9, further comprising:
aggregating the log data to determine a set of commonly-used executables, wherein a commonly-used executable is run more frequently on the plurality of machines.

11. The method of claim 10, further comprising:
training the classification model using the log data from the set of commonly-used executables.

12. The method of claim 8, wherein the classification model is a random forest classifier.

13. The method of claim 8, wherein the classification model is a neural network, a decision tree classifier, a rule-based classifier, a support vector machine, or naïve Bayes classifier.

14. The method of claim 8, wherein the at least one open port is associated with a Transmission Control Protocol (TCP) port number or a User Datagram Protocol (UDP) port number.

15. A device, comprising:
at least one processor and a memory;
wherein the at least one processor is configured to:
identifying a plurality of executables running on a first machine and a plurality of open ports on the first machine;
using a classification model to predict a likelihood of the plurality of executables having an association with each of the plurality of open ports on the first machine, wherein an association indicates usage of a select open port by a select executable, wherein the classification model is trained on training data extracted from a plurality of machines running the plurality of executables with open ports;
determining that at least one open port of the plurality of open ports on the first machine is an unused open port when the classification model predicts a high likelihood of no association between the plurality of executables running on the first machine and the at least one open port of the plurality of open ports on the first machine; and
generating a notification of the unused open port.

16. The device of claim 15, wherein the classification model is a random forest classifier.

17. The device of claim 15 wherein the classification model is based on a neural network, a rule-based classifier, a support vector machine, or a naïve Bayes classifier.

* * * * *